Patented Dec. 9, 1952

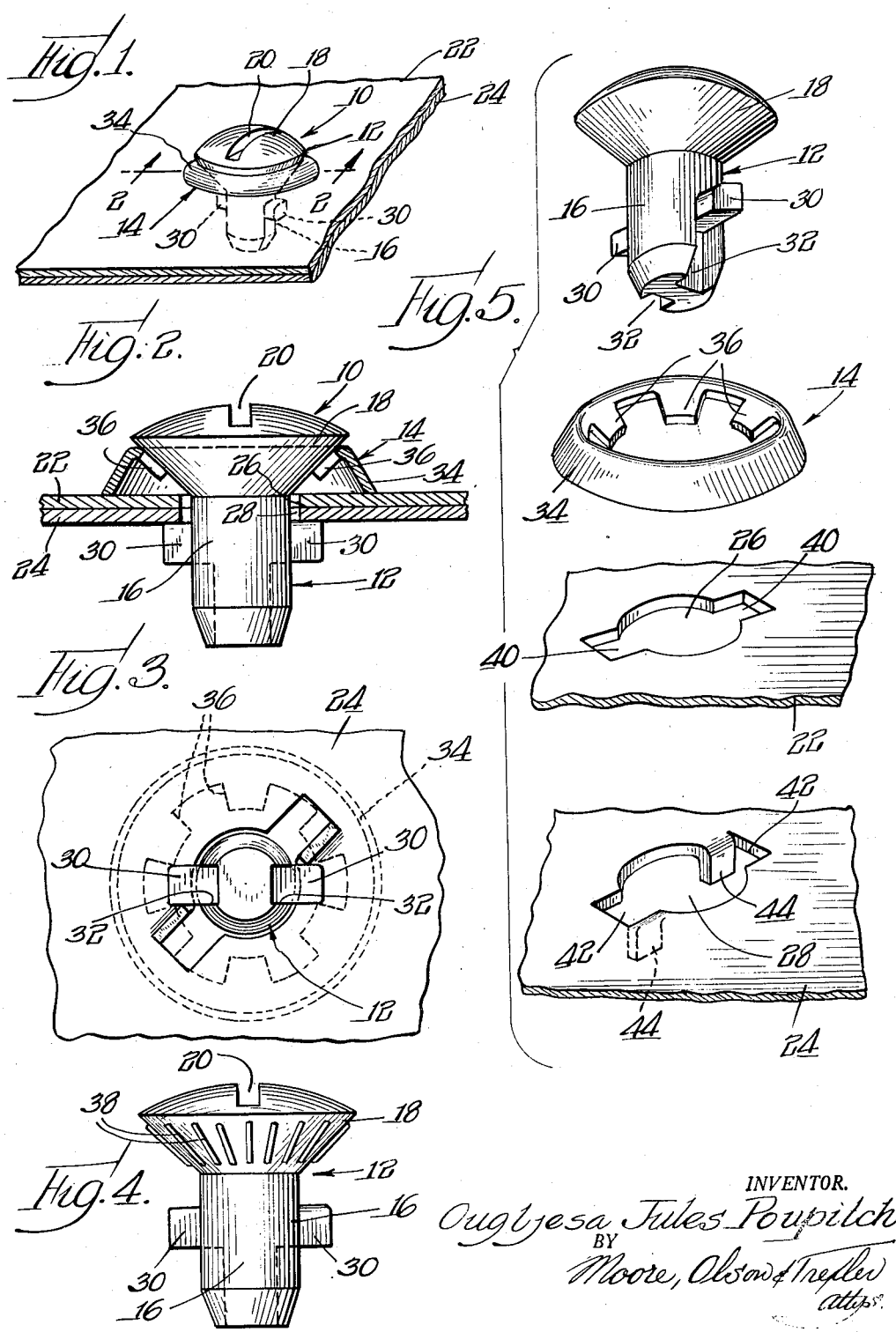

2,620,539

UNITED STATES PATENT OFFICE 2,620,539

FASTENER DEVICE

Ougljesa Jules Poupitch, Chicago, Ill., assignor to Illinois Tool Works, Chicago, Ill., a corporation of Illinois Application March 4, 1950, Serial No. 147,735

6 Claims. (Cl. 24—221)

This invention relates generally to fastening devices and more particularly to fasteners of the quickly operable variety employing a rotary stud member which need only be rotated through 90° in order to secure work pieces in place.

The present invention is concerned primarily with an improved one piece stud arrangement in which the shank of the stud is provided with integral oppositely disposed lugs spaced axially from the head of the stud.

More specifically, the invention contemplates an integral stud member of the type referred to above wherein the oppositely disposed lugs are so formed as to afford maximum strength and so as to reduce to a minimum the possibility of stock fracture normally experienced when a metallic member such as a stud shank is upset or extruded.

A further object of the present invention is to provide a fastener of the type referred to above wherein registration of the stud shank with a complementary work aperture is facilitated materially by having an unbroken circumferential surface extending between the extruded oppositely disposed lugs.

It is another object of the present invention to provide a stud structure, as previously referred to, in which maximum strength of the stud shank is maintained and to this end it is proposed to maintain full stud diameter from the entering side of the lugs to the clamping side of the stud head.

The invention also contemplates a stud in which the oppositely disposed lugs are formed from stud stock positioned axially beyond the finished lugs toward the entering extremity of the stud shank.

It is a further object of the present invention to provide a novel and very practical preassembled washer and stud.

The foregoing and other objects and advantages will be more apparent from the following detailed description when considered in connection with the accompanying drawing, wherein—

Fig. 1 is a perspective view disclosing a fastener of the present invention in operative association with a pair of work sheets;

Fig. 2 is a central, transverse, sectional view of the fastener and work sheets as shown in Fig. 1, said view being taken substantially along the line 2—2 of Fig. 1;

Fig. 3 is a view of the underside of the fastener and work sheets disclosed in Figs. 1 and 2;

Fig. 4 is an elevational view of a stud with a modified head; and

Fig. 5 is an exploded view of the four elements shown in Figs. 1 and 2, namely, the stud, the washer, and the two apertured work pieces or sheets.

Referring now to the drawing more in detail, wherein like numerals have been employed to designate similar parts throughout the various views, it will be seen that one embodiment of the present invention consists of a preassembled stud and washer unit designated generally by the numeral 10. This fastener unit 10 includes a stud member designated generally by the numeral 12 and a washer designated generally by the numeral 14.

The stud 12 includes a shank 16 and a head 18 formed at one extremity thereof. The head 18 may be of various forms depending upon the environment in which it is to be used, and for the purpose of illustrating one practical arrangement an oval head arrangement is shown having a screw driver accommodating cross slot 20. In Figs. 1 to 3 inclusive the fastener is shown in operative association with a pair of work pieces or sheets 22—24, each of which is provided with complementary shank accommodating apertures 26—28, respectively. Particular attention is directed to the structural arrangement of the stud in the vicinity of oppositely disposed lugs 30 formed integral with the stud stock. It will be noted that these lugs 30 are formed by shifting material from the areas 32 at the entering end of the shank by the application of suitable tools (not shown) forced axially of the stud toward the head extremity thereof. The shank material from the areas 32 is shifted and formed into the lugs 30. By employing stock from the entering end of the shank to form the oppositely disposed lugs 30, the circumferential area extending between the lugs thus formed is uninterrupted. In other words, the entire stud shank from the head 18 to the entering side of the lugs 30 maintains its full diameter. It has been found very practical to form the lugs 30 as outlined above with a minimum tendency for the development of cracks in the extruded stock. It is preferable to chamfer or relieve the advancing corner of each of the lugs 30 as clearly illustrated in Fig. 5.

The washer 14 consists of an annular outwardly flared body portion 34. The margin of maximum diameter of the body 14 is designed to bear against the surface of the work sheet 22, Fig. 2, and the upper portion of the body is bent inwardly and presents a plurality of circumferentially spaced axially inclined prongs 36. The free extremities of the prongs 36 terminate in a plane above the plane coincident with the base margin of the annular body 34, and in the disclosed embodiment these prongs 36 are inclined at an angle substantially similar to the angle of inclination of the clamping surface of the stud head 18. The circumferential distance between the free extremities of the prongs 36 is normally slightly less than the circumferential width of the lugs 30. Thus, as the stud shank 16 is telescopically associated with the washer 14, the lugs 30 brought into registration with complementary spaces between the prongs 36 may be forced through the washer when the resiliency of the washer prongs 36 has been overcome. Once the lugs 30 have passed the prongs 36, said prongs spring back to their normal position. The washer is thus retained between the lugs and the clamping surface of the screw head as a preassembled unit. Inadvertent axial separation of the washer 14 from the stud after the above mentioned telescopic association of the parts is prevented.

In instances where desirable the clamping surface of the head 18 may be provided with circumferentially spaced ridges or shoulders 38. These ridges or shoulders 38 cooperate with the washer prongs 36 which present cooperating shoulders in resisting relative rotation between the washer and the stud after the stud has been secured in fastening position as illustrated in Fig. 2.

From the foregoing it will be apparent that after the stud 12 and washer 14 have been telescopically preassembled and work apertures 26 and 28 have been brought into registration, the tapered entering end of the shank 16 may be inserted within these registering apertures. Communicating with the apertures 26 and 28 are radial slots 40 in the work piece 22 and corresponding radial slots 42 in the work piece 24 for receiving the lugs 30. After the clamping surface of the stud head 18 has been axially forced against the prongs 36 and rotation is imparted to the stud, the lugs 30 when rotated through slightly less than 180° overlie the exposed surface of the work sheet 24 and ultimately bear against tabs 44 displaced laterally from the work sheet 24, Fig. 5. These tabs or lugs 44 serve to limit the extent to which the stud may be rotated in a tightening direction and also limit the extent of rotation in the reverse direction so as to automatically position the lugs 30 in registration with the radial recesses 40 and 42. In this position the stud may be disengaged from the work sheets.

The fastener unit described herein is extremely simple and relatively inexpensive to produce. By forming the integral lugs from sections of the stud normally extending beyond the lugs, the remainder of the stud shank is kept intact with full cross sectional strength. By having an uninterrupted peripheral area extending from one lug to another the ease of operation and initial insertion of the stud within a complementary work aperture is facilitated. In instances where it is desirable to employ a resilient washer member beneath the stud head, the present invention provides a very simple and practical method of accomplishing such preassembly.

Obviously the present invention is not limited to the specific structural details disclosed herein, but is capable of other modifications and changes without departing from the spirit and scope of the appended claims.

The invention is hereby claimed as follows:

1. A one-piece rotatable fastener device comprising a solid metallic stud member having a shank, a head at one extremity of said shank and having a work clamping surface projecting radially beyond the periphery of said shank, and integral lug means upset from the entering peripheral portion of the shank and spaced axially from the entering extremity of the shank, said lug means extending radially outwardly from the shank periphery and spaced axially from the clamping side of the head a predetermined distance to accommodate a work structure therebetween, the shank periphery extending between the underside of the head and the underside of said lug means being circumferentially continuous except for the presence of said lug means, to afford substantially unbroken peripheral shank contour and consequent maximum shank cross sectional area throughout said axial extent.

2. A one-piece rotatable fastener device as set forth in claim 1, wherein the side of the lug means facing the head is provided with a cam surface.

3. A one-piece rotatable fastener device as set forth in claim 1, wherein the head is provided with means for accommodating a turning tool.

4. A one-piece rotatable fastener device as set forth in claim 1, wherein the entering portion of the shank extending beyond the lug means comprises a pilot having a tapering entering end to facilitate registration with a work aperture.

5. A one-piece rotatable fastener device as set forth in claim 1, wherein the entering portion of the shank extending beyond the lug means is provided with a longitudinal groove having a width corresponding substantially with the width of the lug means.

6. A one-piece rotatable fastener device as set forth in claim 1, wherein the clamping surface of the stud head is provided with shoulders for cooperation with complementary shoulders in a work piece against which the head is adapted to be clamped.

OUGLJESA JULES POUPITCH.

REFERENCES CITED

The following references are of record in the file of this patent:

UNITED STATES PATENTS

| Number | Name | Date |
| --- | --- | --- |
| 1,876,834 | Berge | Sept. 13, 1932 |
| 2,195,598 | Olson | Apr. 2, 1940 |
| 2,250,050 | Olson | July 22, 1941 |
| 2,356,686 | Newall | Aug. 2, 1944 |
| 2,399,181 | Graham | Apr. 30, 1946 |
| 2,438,499 | Hartman | Mar. 30, 1948 |
| 2,552,805 | Murphy | May 15, 1951 |
| 2,556,988 | Swanson | June 12, 1951 |